(12) United States Patent
Sbabo et al.

(10) Patent No.: US 11,391,363 B2
(45) Date of Patent: Jul. 19, 2022

(54) LOW PROFILE AUXILIARY LUBRICATION SYSTEM

(71) Applicant: Lockheed Martin Corporation, Bethesda, MD (US)

(72) Inventors: Thomas L. Sbabo, Hamden, CT (US); John J. Baldyga, Wallingford, CT (US)

(73) Assignee: Lockheed Martin Corporation, Bethesda, MD (US)

(*) Notice: Subject to any disclaimer, the term of this patent is extended or adjusted under 35 U.S.C. 154(b) by 301 days.

(21) Appl. No.: 16/394,540

(22) Filed: Apr. 25, 2019

(65) Prior Publication Data

US 2020/0340574 A1 Oct. 29, 2020

(51) Int. Cl.
*F16H 57/04* (2010.01)
*F16N 7/40* (2006.01)
*F16H 57/02* (2012.01)

(52) U.S. Cl.
CPC ..... *F16H 57/0442* (2013.01); *F16H 57/0405* (2013.01); *F16H 57/045* (2013.01); *F16H 57/0435* (2013.01); *F16H 57/0441* (2013.01); *F16H 57/0445* (2013.01); *F16H 2057/02043* (2013.01); *F16N 7/40* (2013.01)

(58) Field of Classification Search
CPC ............ F16H 57/0435; F16H 57/0405; F16H 57/0442; F16H 57/045

See application file for complete search history.

(56) References Cited

U.S. PATENT DOCUMENTS

| 4,717,000 | A | * | 1/1988 | Waddington | F01D 25/18 |
| | | | | | 184/6.1 |
| 5,121,815 | A | | 6/1992 | Francois et al. | |
| 6,446,755 | B1 | * | 9/2002 | Varailhon | B64C 27/14 |
| | | | | | 184/11.2 |
| 6,666,300 | B2 | | 12/2003 | Varailhon et al. | |
| 9,624,798 | B2 | | 4/2017 | Mullen et al. | |
| 9,732,840 | B2 | | 8/2017 | Harreau | |
| 10,746,284 | B2 | * | 8/2020 | Gmirya | F16H 57/0456 |
| 2005/0056490 | A1 | | 3/2005 | Maret et al. | |
| 2016/0123456 | A1 | * | 5/2016 | Goujet | F16H 57/0405 |
| | | | | | 184/6.4 |
| 2016/0363208 | A1 | * | 12/2016 | Louis | F16N 7/40 |
| 2016/0376949 | A1 | * | 12/2016 | Parnin | F01D 25/18 |
| | | | | | 73/112.01 |
| 2017/0284535 | A1 | | 10/2017 | Ehinger | |

(Continued)

FOREIGN PATENT DOCUMENTS

WO 2016171786 A1 10/2016

OTHER PUBLICATIONS

Extended European Search Report issued by the European Patent Office for Application No. 20171248.6 dated Jul. 6, 2020 (10 pages).

*Primary Examiner* — Minh Truong
(74) *Attorney, Agent, or Firm* — Michael Best & Friedrich LLP

(57) ABSTRACT

A lubrication system for a transmission assembly includes a primary reservoir, at least one primary jet, a primary circulating system fluidly coupling the primary reservoir and the at least one primary jet, a secondary reservoir, at least one secondary jet, and a secondary circulating system fluidly coupling the primary reservoir and the at least one secondary jet and fluidly coupling the primary reservoir and the secondary reservoir.

18 Claims, 3 Drawing Sheets

(56) References Cited

U.S. PATENT DOCUMENTS

| | | |
|---|---|---|
| 2018/0106360 A1 | 4/2018 | Gmirya et al. |
| 2018/0363762 A1* | 12/2018 | Kiyokami ............... F16H 57/04 |
| 2019/0178366 A1* | 6/2019 | De Meerschman .. F16H 57/045 |
| 2020/0032895 A1* | 1/2020 | Kiyokami ........... F16H 57/0457 |
| 2020/0132184 A1* | 4/2020 | Umeki ................... B60K 6/445 |

* cited by examiner

LOW PROFILE AUXILIARY LUBRICATION SYSTEM

BACKGROUND

The embodiments disclosed herein relate to transmission systems, and more particularly, to a lubrication system of a mechanical power transmission system of a rotary wing aircraft.

Rotary-wing aircraft power transmission systems incorporate a multitude of gears and bearings which are subject to heat, sliding and surface wear. Such conditions are significantly increased during oil-out operating conditions caused by, for example, ballistic damage, pump failure and system leaks. The primary components of a power transmission system which may be failure points under oil-out conditions include bearings and gears which are constantly oil lubricated under normal conditions using pressurized oil jets or splash oil lubrication methods.

The United States Department of Defense (U.S. DoD) currently imposes a requirement that all rotary-wing aircraft power transmission systems operate for a predetermined period of time in an oil-out condition. The requirement includes the capability to maintain flight operations for 30 to 60 minutes during the oil-out condition, albeit at reduced power levels, sufficient only to sustain level flight operations.

Various emergency or secondary lubrication systems are known and practiced. Lubricating wicks and jets have been provided for lubricating individual components along with a small recirculation system. Air aspirated nozzles have also been utilized for delivering a stream of oil to each individual component. Even through relatively effective, these existing systems may not completely satisfy the U.S. DoD imposed requirements.

BRIEF DESCRIPTION

According to an embodiment, a lubrication system for a transmission assembly includes a primary reservoir, at least one primary jet, a primary circulating system fluidly coupling the primary reservoir and the at least one primary jet, a secondary reservoir, at least one secondary jet, and a secondary circulating system fluidly coupling the primary reservoir and the at least one secondary jet and fluidly coupling the primary reservoir and the secondary reservoir.

In addition to one or more of the features described above, or as an alternative, in further embodiments comprising a housing, wherein the at least one primary jet and the at least one secondary jet are positioned within an interior of the housing.

In addition to one or more of the features described above, or as an alternative, in further embodiments the secondary reservoir is positioned within the interior of the housing.

In addition to one or more of the features described above, or as an alternative, in further embodiments the secondary reservoir is positioned vertically above the primary reservoir such that lubricant in the secondary reservoir falls into the primary reservoir.

In addition to one or more of the features described above, or as an alternative, in further embodiments the primary circulating system further comprises includes a primary pump for delivering lubricant from the primary reservoir to the at least one primary jet.

In addition to one or more of the features described above, or as an alternative, in further embodiments the secondary circulating system further comprises a secondary pump, a first conduit extending between the secondary pump and the at least one secondary jet, and a second conduit extending between the secondary pump and the secondary reservoir.

In addition to one or more of the features described above, or as an alternative, in further embodiments the secondary circulating system further comprising a pressure regulating valve located within the second conduit, upstream from the secondary reservoir.

In addition to one or more of the features described above, or as an alternative, in further embodiments comprising a processing device operably coupled to a portion of the secondary circulating system to selectively activate and deactivate the secondary jet.

In addition to one or more of the features described above, or as an alternative, in further embodiments the processing device is configured to control operation of the secondary circulating system in response to an operating condition of the primary circulating system.

In addition to one or more of the features described above, or as an alternative, in further embodiments the processing device is configured to determine whether the lubrication system is in a normal operating condition or an abnormal operating condition based on a pressure within the primary circulating system, to deactivate the secondary circulating system when in the normal operating condition such that lubrication from the primary reservoir is not provided to the at least one secondary jet, and to active the second circulating system when in the abnormal operating condition such that lubrication from the primary reservoir is provided to the at least one secondary jet.

In addition to one or more of the features described above, or as an alternative, in further embodiments in the normal operating condition, the primary circulating system delivers lubricant from the reservoir to the at least one primary jet from the primary reservoir and the secondary circulating system is non-operational.

In addition to one or more of the features described above, or as an alternative, in further embodiments in the abnormal operating condition, the primary circulating system is not operational and does not provide lubricant from the primary reservoir to the at least one primary jet, and the secondary circulating system delivers lubricant from the primary reservoir to the at least one secondary jet.

In addition to one or more of the features described above, or as an alternative, in further embodiments in the abnormal operating condition, the secondary circulating system further delivers lubricant from the primary reservoir to the secondary reservoir and the secondary reservoir provides the lubricant to the primary reservoir at a rate which is substantially the same as a rate at which lubricant flows through the at least one secondary jet in the secondary circulating system.

In addition to one or more of the features described above, or as an alternative, in further embodiments the transmission assembly is a gearbox.

In addition to one or more of the features described above, or as an alternative, in further embodiments the gearbox is a main power transmission gearbox of a rotary-wing aircraft.

According to another embodiment, a method of operating a lubrication system of a transmission assembly includes monitoring an operational parameter of a primary circulating system of the lubrication system, determining an operating condition of the lubrication system in response to the operational parameter as one of a normal operating condition and an abnormal operating condition, delivering lubricant from a reservoir to at least one primary jet via the primary circulating system when the operating condition of the lubrication system is determined to be the normal operating condition, delivering lubricant from the reservoir to at least one secondary jet via a secondary circulating system when the operating condition of the lubrication system is determined to be the abnormal operating condition, and delivering lubricant to the secondary reservoir via the secondary circulating system when a pressure within the secondary circulating system exceeds a threshold.

In addition to one or more of the features described above, or as an alternative, in further embodiments the monitoring the operational parameter of a primary circulating system of the lubrication system includes sensing a pressure within the primary circulating system.

In addition to one or more of the features described above, or as an alternative, in further embodiments the determining the operating condition of the lubrication system in response to the operational parameter further comprises: determining that operation of the lubrication system is normal if the operational parameter exceeds a threshold and determining that operation of the lubrication system is abnormal if the operational parameter is below a threshold.

In addition to one or more of the features described above, or as an alternative, in further embodiments in response to determining that operation of the lubrication system is abnormal, initiating operation of the secondary circulating system.

In addition to one or more of the features described above, or as an alternative, in further embodiments in response to determining that operation of the lubricating system is abnormal operating condition, stopping operation of the primary circulating system.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
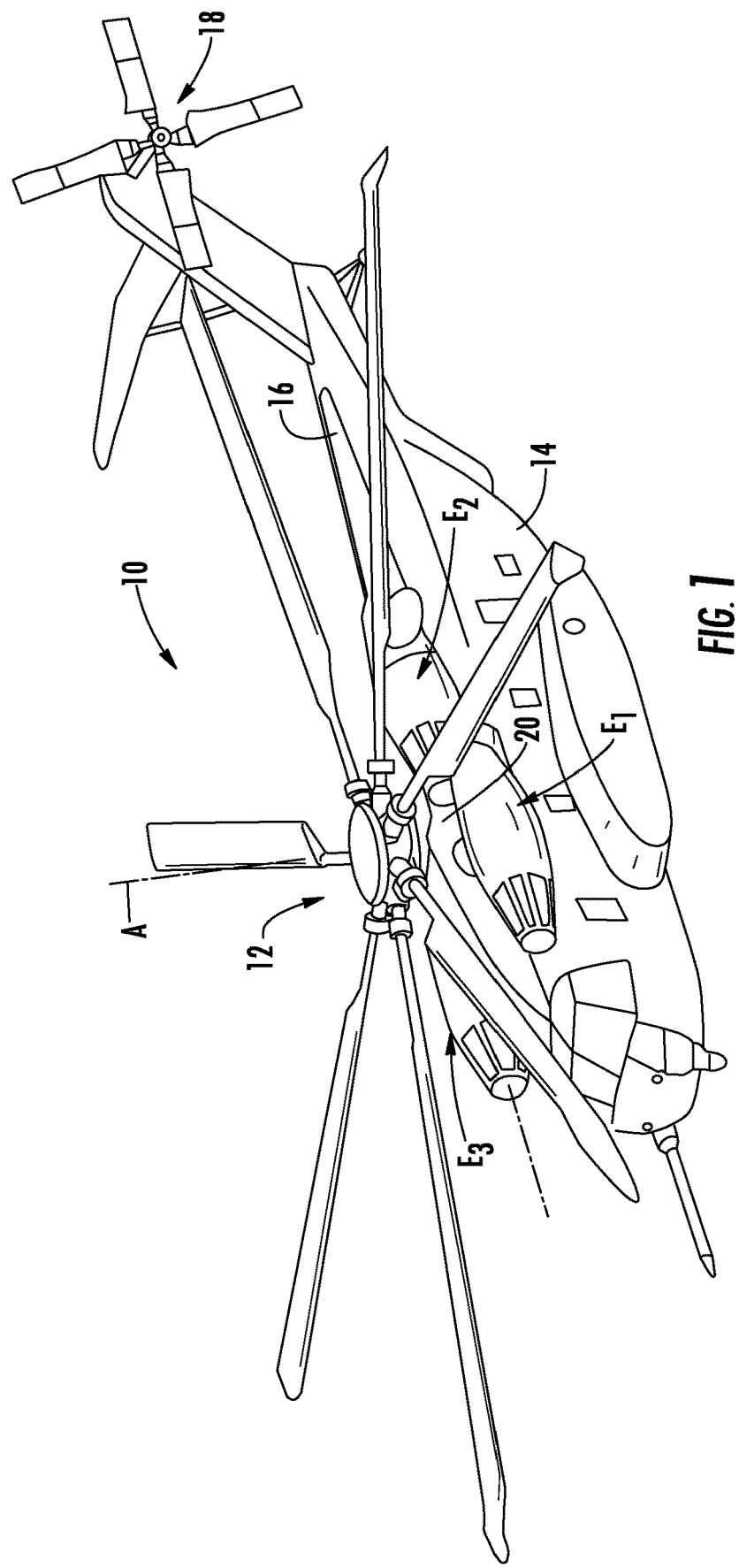
FIG. 1 is a perspective view of an example of a rotary-wing aircraft.

Referring to FIG. 1, schematically illustrated is a rotary-wing aircraft 10 having a main rotor system 12 in an exemplary embodiment. The aircraft 10 includes an airframe 14 having an extending tail 16 which mounts a tail rotor system 18, such as an anti-torque system. The main rotor system 12 is driven through a main power transmission gearbox, illustrated schematically at 20, by one or more engines E. Although a particular helicopter configuration is illustrated and described in the disclosed embodiment, other configurations and/or machines, such as ground vehicles, jet aircraft, turbofan engines, high speed compound rotary wing aircraft with supplemental translational thrust systems, dual contra-rotating, coaxial rotor system aircraft, quad-copter, multi-rotor lifting bodies, turbo-props, tilt-rotors and tilt-wing aircraft, and the like may also benefit from the embodiments described herein. Aircraft 10 may be a piloted (e.g., a manned aircraft), an unmanned aerial vehicle, optionally piloted vehicle, etc.

Figure 2:
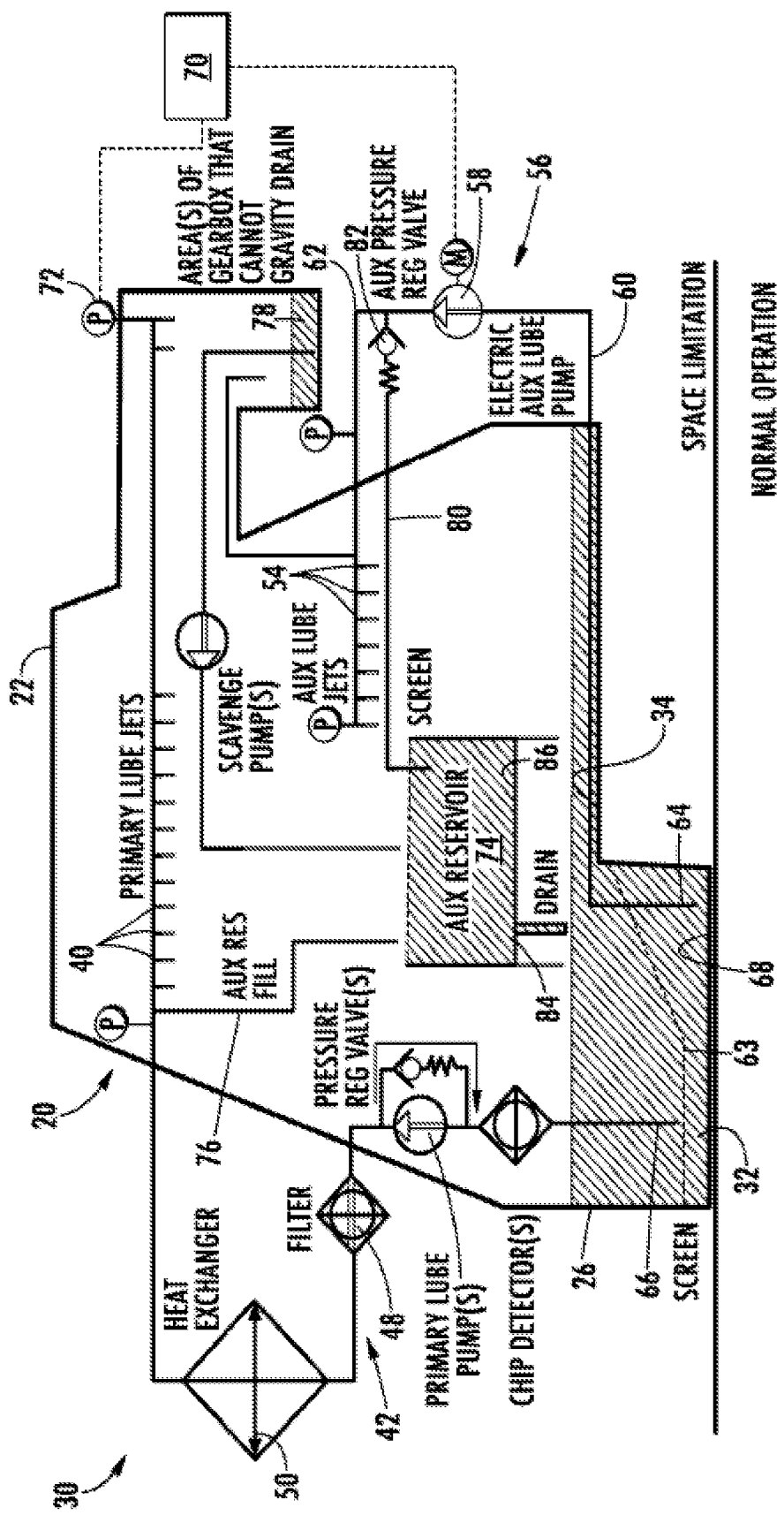
FIG. 2 schematic diagram of a lubrication system of a gearbox of a rotary wing aircraft in normal operation according to an embodiment.
Figure 3:
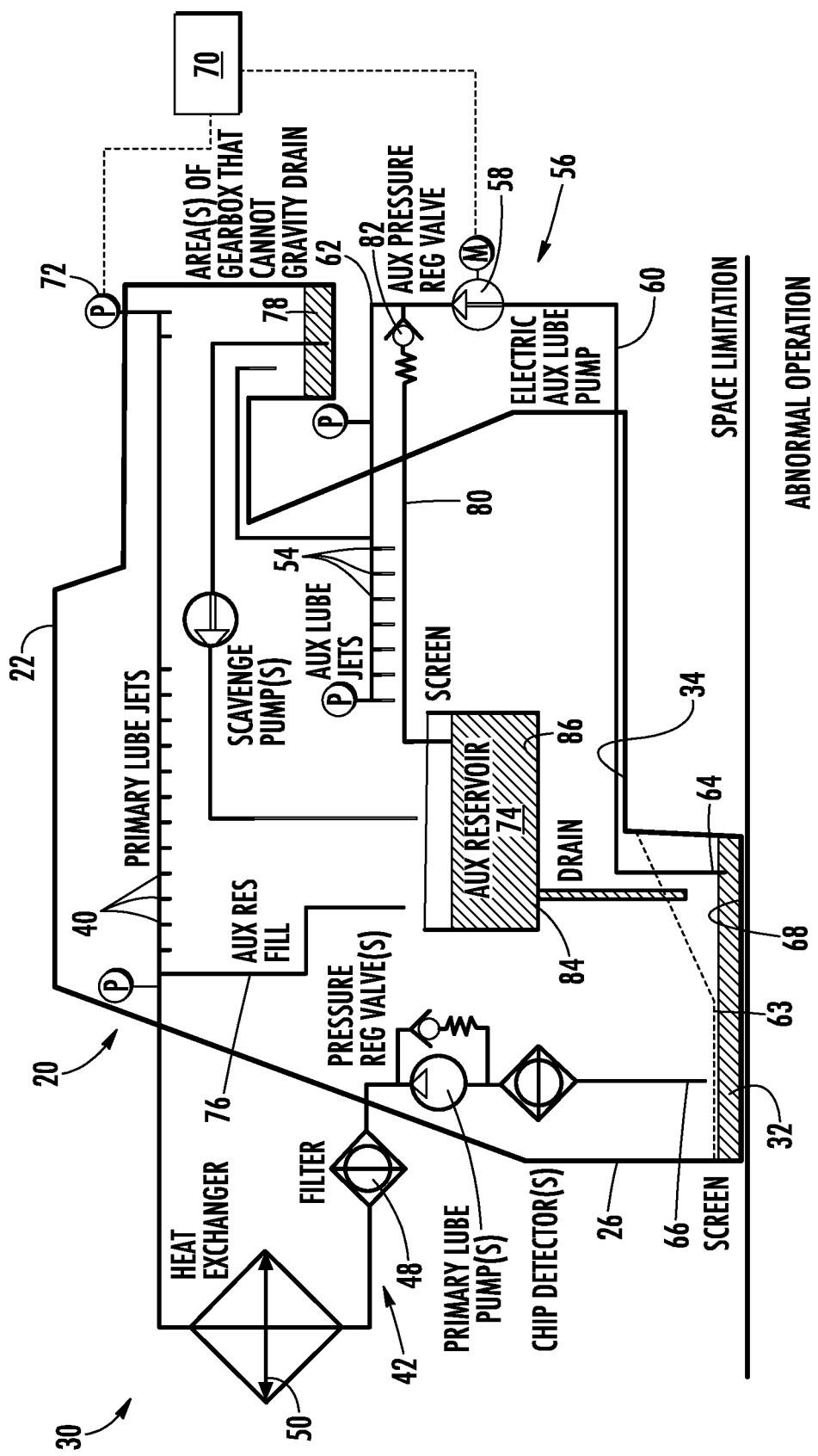
FIG. 3 schematic diagram of another lubrication system of a gearbox of a rotary wing aircraft in an abnormal operation according to an embodiment.

With reference to FIG. 2, a schematic diagram of a gearbox, such as the main power transmission gearbox 20 for example, is shown. Although the disclosure is provided with reference to the illustrated rotary-wing aircraft main power transmission gearbox having 20 highly-loaded torque transmitting gears and bearings, it should be appreciated that the teachings herein are applicable to any system which may require oil-out operation. The gearbox 20 includes a gearbox housing 22 and an interior 24. A plurality of components (not shown), such as bearings and gears for example, are disposed within the interior 24 of the gearbox housing 22.

A lubrication system 30 communicates with the gearbox 20. The lubrication system 30 generally includes a reservoir 32 which retains a quantity of lubricant, i.e. lubricating oil. As shown, the reservoir 32 may be arranged adjacent a side 26 of the gearbox housing 22. In the illustrated, non-limiting embodiment, the reservoir 32 may extend vertically beyond a bottom 34 of the gearbox housing 22. Accordingly, the interior 24 of the gearbox housing 22 may be fluidly coupled to the reservoir 32. Alternatively or in addition, a pump (not shown) may be mounted at the bottom 34 of the gearbox housing 22 and used to direct lubricant collected at the bottom 34 of the gearbox housing 22 back to the reservoir 32.

The lubrication system 30 additionally includes one or more primary jets 40 and a primary circulating system 42 for circulating lubricant from the reservoir to the primary jets and/or to other high friction locations to provide for effective operation of the gearbox assembly during normal operating conditions. In an embodiment, the one or more primary jets 40 are mounted at various locations within the interior 24 of the gearbox housing 22. However, the primary jets 40 may be mounted at any suitable position to deliver lubricant to the components within the interior 24 of the gearbox housing 22. The term "jet" as used herein is intended to include any suitable mechanism for delivering a quantity of lubricant, including but not limited to a nozzle, a misting system, and a drip tank system for example. The primary circulating system 42 may include at least one primary pump 44 for drawing lubricant from the reservoir 32. In addition, other components, such as a filter 48, heat exchanger 50, and bypass valve (not shown) may be disposed within the fluid flow path of the primary circulating system 42. The primary circulating system 42 need not be described in detail herein as various systems may be utilized in accordance with the principles of the present disclosure. Furthermore, it should be understood that various lubricants and lubricating oils may also be used herewith, such as, for example, DOD-L-85734 or MIL-PRF-23699.

The lubrication system 30 additionally includes one or more secondary jets 54 and a secondary circulating system 56 for circulating lubricant from the reservoir 32 to the secondary or auxiliary jets 54 and/or to other high friction locations to provide for effective operation of the gearbox 20 during abnormal operating conditions, such as in the event of an emergency, or following a loss of pressure within the primary circulating system. The secondary jets 54 may be located at the most critical areas of the gearbox 20, for example the area most susceptible to friction or heat, within the gearbox housing 22. In the illustrated, non-limiting embodiment, the secondary circulating system 56 includes a secondary pump 58. As shown, a first conduit 60 extends from the reservoir 32 to an inlet of the secondary pump 58 to fluidly couple the secondary pump 58 and the reservoir 32. An outlet of the secondary pump 58 is arranged in fluid communication with the plurality of secondary jets 54 via a second conduit 62.

A screen extends from the bottom surface 34 of the gearbox 22 across the reservoir 32. In the illustrated, non-limiting embodiment, the screen has a non-linear contour. For example, the screen 63 has a first angled section arranged adjacent the bottom surface 34 of the gearbox 22, and a second horizontal portion extending from a center of the reservoir 32 to an outer side wall 26 of the gearbox 22. In an embodiment, the screen is angled to allow debris to tumble toward the primary oil inlet. Further, an inlet 64 of the first conduit 60 is located at a position vertically lower than an inlet 66 of the primary circulating system 42 within the reservoir 32. In the illustrated, non-limiting embodiment, the inlet end 64 of the first conduit 60 of the secondary circulating system 56 is positioned generally adjacent a bottom 68 of the reservoir 32, below the screen 63, and the inlet end 66 of the primary circulating system 42 is disposed vertically above the screen 63. Because lubricant, but not debris can pass through the openings formed in the screen 63, the screen 63 is intended to remove debris generated by the system from the flow of lubricant provided to the primary circulating system 42 during normal operation. By positioning the inlet end 64 of the conduit 60 vertically below the screen 63, the secondary circulating system 56 is operable to draw lubricant from the reservoir 32 when the level of lubricant within the reservoir 32 is less than required to maintain an operating pressure for the primary circulating system 42.

In an embodiment, the at least one primary pump 44 is a mechanical unit directly connected to the drive train of the gearbox, such as via one or more gears for example. However, embodiments where the at least one primary pump 44 is driven by another device are also within the scope of the disclosure. Operation of the at least one secondary pump 58 is controlled by a processing device 70. In an embodiment, the processor logic of the processing device 70 is initiates the secondary pump 58 when the pressure within the primary circulating system 42 falls below a defined threshold.

During normal operation of the lubrication system 30, the secondary circulating system 56 is non-operational, and therefore lubricant is not provided to the secondary jets 54. The pressure of the primary circulating system and the level of lubricant within the reservoir 32 are related. Accordingly, a pressure of the primary circulating system below a defined threshold indicates that the level of lubricant within the reservoir 32 is below the inlet 66 associated with the primary pump 44. This is because when the one or more primary pumps 44 are no longer able to draw a sufficient quantity of lubricant from the reservoir 32, and therefore an air/oil mixture or only air will be drawn through the inlet 66, the pressure within the primary circulating system 42 drops. In an embodiment, the primary circulating system 42 may include one or more pressure devices 72, such as sensors for example, operable to monitor the pressure within the primary circulating system 42. The pressure devices 72 may be arranged in communication with the processing device 70.

In response to sensing a reduced pressure within the primary circulating system 42, operation of the secondary pump 58 is initiated via the processing device 70. The secondary pump 58 is operable to draw lubricant from adjacent the bottom 68 of the reservoir 32 and circulate that lubricant to one or more secondary jets 54. In embodiments where the at least one primary pump 44 of the primary circulating system 42 is mechanically driven, the primary pump 44 will continue to operate and circulate air during operation of the secondary circulating system 56. However, in embodiments where the one or more primary pumps 44 are electrically driven, such as via processing device 70 for example, the one or more primary pumps 44 may be deactivated in response to detection of the reduced pressure and/or activation of the secondary pump 58.

In embodiments where the available space surrounding the gearbox 20 is limited, the overall size, an in particular the depth, of the reservoir 32 may be restricted. For example, in the illustrated, non-limiting embodiment, the depth of the reservoir 32 extends minimally beyond the inlet 66 associated with the primary circulating system 42. Accordingly, in such low profile configurations, the lubrication system 30 may additionally include a secondary reservoir 74 disposed within the interior 24 of the gearbox housing 22. The secondary reservoir 74 may be configured to retain a volume of lubricant for use under abnormal operating conditions or in "emergency conditions," such as an oil-out condition for example.

As shown, the secondary reservoir 74 is vertically offset from the bottom 34 of the gearbox housing 22. In an embodiment, the primary circulating system 42 includes a conduit 76 having an outlet arranged in fluid communication with the secondary reservoir 74. Alternatively, or in addition, lubricant may be pumped into the secondary reservoir 74 from one or more areas of the gearbox 22 from which lubricant is unable to drain via gravity, illustrated schematically at 78. Accordingly, during normal operation of the lubricating system 30, lubricant is provided to the secondary reservoir 74.

The secondary reservoir 74 is additionally arranged in fluid communication with an outlet of the secondary pump 58 via a third conduit 80. The second conduit 62 and the third conduit 80 are arranged generally in parallel such that a first portion of the lubricant output from the secondary pump 58 may be provided to the secondary jets 54 and a second portion of the lubricant provided at the outlet of the secondary pump 58 may be delivered to the secondary reservoir 74.

In an embodiment, a pressure regulating valve 82 is disposed within the third conduit 80. Accordingly, when the pressure of the lubricant output from the secondary pump 58 exceeds the threshold of the pressure regulating valve 80, the valve will open, thereby allowing the flow of lubricant to the secondary reservoir 74. When the pressure of the lubricant output from the secondary pump 58 is below the threshold of the pressure regulating valve 80, the valve remains closed. If the total amount of lubricant within the lubrication system 30 is limited, the pressure within the secondary circulating system 56 will be limited. In such instances, the lubricant provided at the outlet of the secondary pump 58 will be provided to the secondary jets 54 but not to the secondary reservoir 74. Inclusion of a pressure regulating valve 82 having an outlet in communication with the secondary reservoir 74 ensures that a maximum amount of lubricant is saved from being lost to a compromised primary system 42.

The secondary reservoir 74 may be arranged in fluid communication with the interior 24 of the gearbox housing 22. In an embodiment, one or more openings 84 are formed in a bottom surface 86 of the secondary reservoir 74. As a result, a portion of the lubricant accumulated within the secondary reservoir 74 may fall therefrom into the reservoir 32, or alternatively into the gearbox housing 22, where it is collected at the bottom 34 of the interior 24, and provided to the reservoir 32. Further, it should be understood that the one or more openings 84 may be sized to restrict or limit the flow of lubricant into the gearbox housing 22. In an embodiment, the rate at which lubricant is drained from the secondary reservoir 74 may be substantially the same as the rate at which lubricant flows through the secondary circulating system 56. As a result, the secondary reservoir 74 maintains an adequate volume of lubricant for initial charging of the system and for occasional losses to the primary system 42, such as due to maneuvering for example. Further, in an embodiment, the rate at which lubricant is provided to the primary reservoir 32 from the secondary reservoir 74 is substantially the same as the rate that lubricant flows through the at least one secondary jet 54 of the secondary circulating system 56.

A lubrication system 30 as illustrated and described herein is capable of providing lubricant necessary to pressurize a secondary circulating system 56 within the structural envelope of existing systems.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A lubrication system for a transmission assembly comprising:
   a primary reservoir;
   at least one primary jet;
   a primary circulating system fluidly coupling the primary reservoir and the at least one primary jet;
   a secondary reservoir fluidly coupled to the primary reservoir by a conduit;
   at least one secondary jet;
   a secondary circulating system fluidly coupling the primary reservoir and the at least one secondary jet, the secondary circulating system having an operational condition, in which lubricant is permitted to flow to the at least one secondary jet, and a non-operational condition, in which lubricant is restricted from flowing to the at least one secondary jet; and
   a processing device having processor logic configured to operate the secondary circulating system in the operational condition or the non-operational condition in response to an operating condition of the primary circulating system,
   wherein the primary circulating system includes the conduit for fluidly coupling the secondary reservoir to the primary reservoir when the secondary circulating system is in the non-operational condition; wherein the second reservoir is positioned vertically above the primary reservoir such that lubricant in the secondary reservoir drains directly into the primary reservoir; and wherein the secondary circulating system further comprises a secondary pump, a first conduit extending between the secondary pump and the at least one secondary jet, and a second conduit extending between the secondary pump and the secondary reservoir.

2. The lubrication system of claim 1, further comprising a housing, wherein the at least one primary jet and the at least one secondary jet are positioned within an interior of the housing.

3. The lubrication system of claim 2, wherein the secondary reservoir is positioned within the interior of the housing.

4. The lubrication system of claim 1, wherein the primary circulating system further comprises a primary pump for delivering lubricant from the primary reservoir to the at least one primary jet.

5. The lubrication system of claim 1, wherein the secondary circulating system further comprising a pressure regulating valve located within the second conduit, upstream from the secondary reservoir.

6. The lubrication system of claim 1, wherein the operating operational condition of the secondary circulating system is based on a sensed pressure within the primary circulating system, and the processing device is configured to determine whether the lubrication system is in a normal operating condition or an abnormal operating condition based on the sensed pressure.

7. The lubrication system of claim 6, wherein when the lubrication system is in the normal operating condition the secondary circulating system is in the non-operational condition, and when the lubrication system is in the abnormal operating condition the second circulating system is in the operational condition.

8. The lubrication system of claim 7, wherein when the lubrication system is in the normal operating condition, the primary circulating system delivers lubricant from the primary reservoir to the at least one primary jet and the secondary circulating system is in the non-operational condition and does not provide lubricant to the at least one secondary jet.

9. The lubrication system of claim 7, wherein when the lubrication system is in the abnormal operating condition, the primary circulating system is not operational and does not provide lubricant from the primary reservoir to the at least one primary jet, and the secondary circulating system delivers lubricant from the primary reservoir to the at least one secondary jet.

10. The lubrication system of claim 7, wherein when the lubrication system is in the abnormal operating condition, the secondary circulating system further delivers lubricant from the primary reservoir to the secondary reservoir and the secondary reservoir provides the lubricant to the primary reservoir at a rate which is substantially the same as a rate at which lubricant flows through the at least one secondary jet in the secondary circulating system.

11. The lubrication system of claim 1, wherein the transmission assembly is a gearbox.

12. The lubrication system of claim 11, wherein the gearbox is a main power transmission gearbox of a rotary-wing aircraft.

13. The lubrication system of claim 1, wherein when the secondary circulating system is in the operational condition lubricant from the primary reservoir is provided to at least one secondary jet and when the secondary circulating system is in the non-operational condition lubricant is not provided to the at least one secondary jet.

14. A method of operating a lubrication system of a transmission assembly, the lubrication system comprising a primary circulating system fluidly coupling a primary reservoir to at least one primary jet, a secondary reservoir positioned vertically above the primary reservoir such that lubricant in the secondary reservoir drains directly in the primary reservoir, the secondary reservoir fluidly coupled to the primary reservoir by a conduit of the primary circulating system, and a secondary circulating system fluidly coupling the primary reservoir and at least one secondary jet, the secondary circulating system including a secondary pump, a first conduit extending between the secondary pump and the at least one secondary jet, and a second conduit extending between the secondary pump and the secondary reservoir, the method comprising:
   monitoring an operational parameter of the primary circulating system of the lubrication system;
   determining an operating condition of the lubrication system in response to the operational parameter as one of a normal operating condition and an abnormal operating condition;
   delivering lubricant from the primary reservoir to at least one primary jet via the primary circulating system when the operating condition of the lubrication system is determined to be the normal operating condition;
   delivering lubricant from the primary reservoir to at least one secondary jet via the secondary circulating system when the operating condition of the lubrication system is determined to be the abnormal operating condition; and
   delivering lubricant to the secondary reservoir via the secondary circulating system when a pressure within the secondary circulating system exceeds a threshold.

15. The method of claim 14, wherein the monitoring the operational parameter of the primary circulating system of the lubrication system includes sensing a pressure within the primary circulating system.

16. The method of claim 15, wherein the determining the operating condition of the lubrication system in response to the operational parameter further comprises:
   determining that operation of the lubrication system is normal if the operational parameter exceeds a threshold; and
   determining that operation of the lubrication system is abnormal if the operational parameter is below a threshold.

17. The method of claim 15, wherein in response to determining that operation of the lubrication system is abnormal, initiating operation of the secondary circulating system.

18. The method of claim 15, wherein in response to determining that operation of the lubricating system is abnormal operating condition, stopping operation of the primary circulating system.

* * * * *